US012657208B1

(12) United States Patent
Leon et al.

(10) Patent No.:  US 12,657,208 B1
(45) Date of Patent:  Jun. 16, 2026

(54) PARALLEL PROCESSING OF DATABASE RECOVERY LOGS

(71) Applicant: Oracle International Corporation, Redwood Shores, CA (US)

(72) Inventors: Marcelo Leon, Redwood City, CA (US); Adrian Prieto, Jalisco (MX)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/986,520

(22) Filed: Dec. 18, 2024

(51) Int. Cl.
*G06F 16/27* (2019.01)
*G06F 11/1446* (2026.01)

(52) U.S. Cl.
CPC ........ *G06F 16/273* (2019.01); *G06F 11/1469* (2013.01); *G06F 2201/80* (2013.01)

(58) Field of Classification Search
CPC . G06F 16/273; G06F 11/1469; G06F 2201/80
See application file for complete search history.

(56) References Cited

U.S. PATENT DOCUMENTS

| | | | | |
|---|---|---|---|---|
| 2014/0379658 A1* | 12/2014 | Cheriton | ............. | G06F 16/2365 |
| | | | | 707/639 |
| 2016/0344834 A1* | 11/2016 | Das | ..................... | H04L 67/1097 |
| 2021/0064576 A1* | 3/2021 | Shemer | .............. | G06F 16/1748 |
| 2021/0081389 A1* | 3/2021 | Liu | ................... | G06F 16/24552 |
| 2024/0273080 A1* | 8/2024 | Dragojevic | ......... | G06F 16/2329 |
| 2025/0119467 A1* | 4/2025 | Gracia-Tinedo | ...... | G06F 3/0629 |

* cited by examiner

*Primary Examiner* — Courtney Harmon
(74) *Attorney, Agent, or Firm* — Mughal Gaudry & Franklin PC

(57)  ABSTRACT

Methods, systems, and computer-readable media are provided for accessing a plurality of log records describing a plurality of prior transactions and separating the plurality of log records into sequential segments of log records. A synchronization data structure is generated that constrains execution of a first transaction of a first segment until after at least a second transaction of the first segment based at least in part on a stored indication, in the synchronization data structure. The first transaction of the first segment is executed at least in part by accessing the synchronization data structure to constrain playback of the first transaction until after the second transaction. The resulting values are regenerated by executing other transactions of the sequential segments. The regenerated resulting values are stored as a replacement set of data and data management service access is provided to the replacement set of data.

21 Claims, 11 Drawing Sheets

800

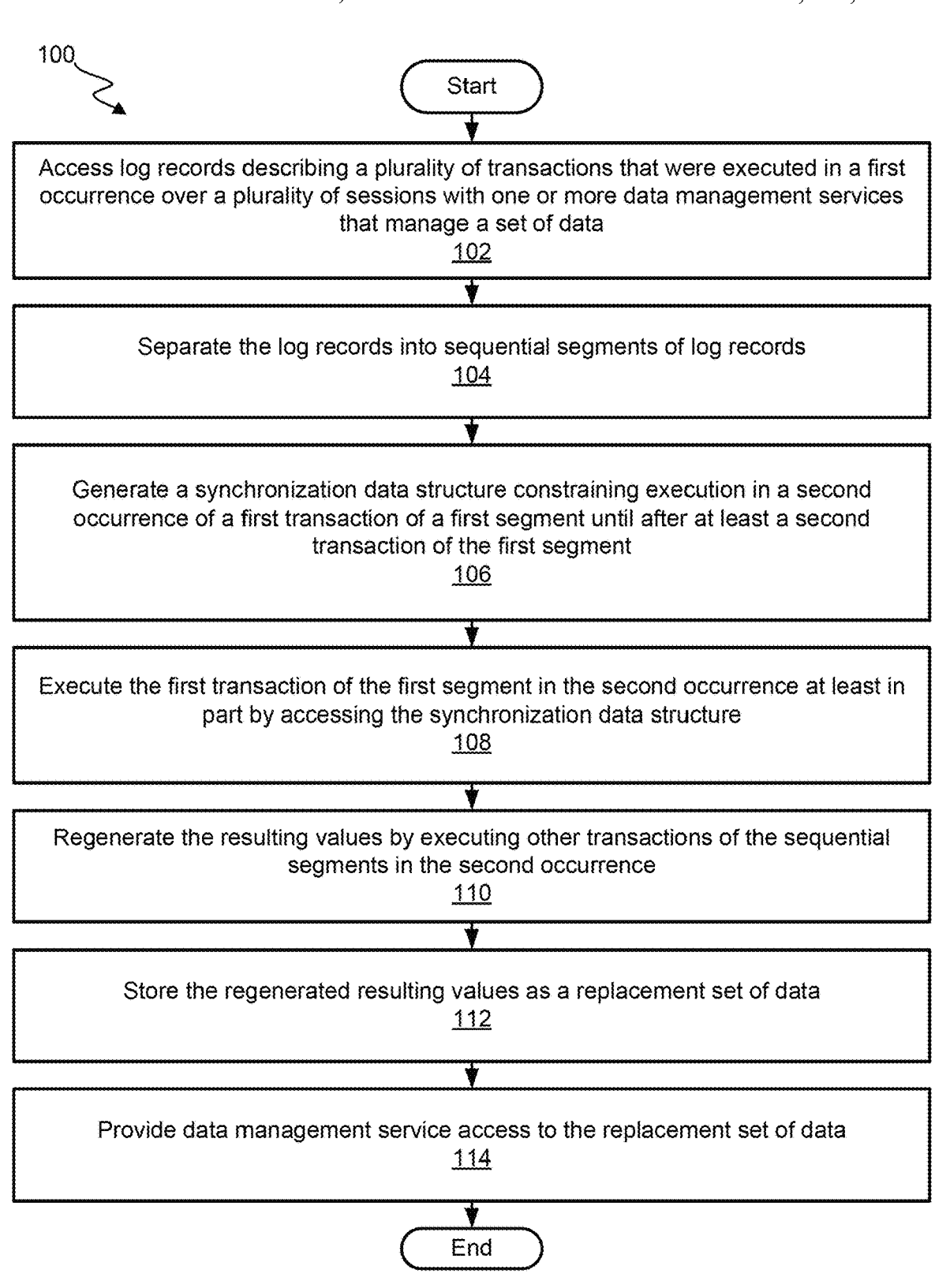

100

Start

Access log records describing a plurality of transactions that were executed in a first occurrence over a plurality of sessions with one or more data management services that manage a set of data
102

Separate the log records into sequential segments of log records
104

Generate a synchronization data structure constraining execution in a second occurrence of a first transaction of a first segment until after at least a second transaction of the first segment
106

Execute the first transaction of the first segment in the second occurrence at least in part by accessing the synchronization data structure
108

Regenerate the resulting values by executing other transactions of the sequential segments in the second occurrence
110

Store the regenerated resulting values as a replacement set of data
112

Provide data management service access to the replacement set of data
114

End

PARALLEL PROCESSING OF DATABASE RECOVERY LOGS

BACKGROUND

An in-memory database (IMDB) is a database system that stores and manages data entirely in computer memory, as opposed to on disk or other stable storage devices. This allows for very fast data access and retrieval, as there is no need to access data on slower storage devices. IMDBs are commonly used in applications that require fast, real-time access to data, such as financial trading, gaming, and telecommunications.

In an in-memory database or other database, data may be lost in the event of a system crash, a loss of power, or another unplanned outage unless data persistence mechanisms are put in place to store the data in backup, replicated, or redundant locations, such as by using frequent writes to a non-volatile storage, called checkpointing. Database recovery is the process of restoring a database to a consistent and usable state after a failure, outage, or other error has occurred.

Some database recovery mechanisms use checkpoint files and transaction logs. Checkpoint files are a snapshot of the entire database contents at a given time, and transaction logs are records of changes made to indexes or blocks of data of the database during a database session. Database recovery involves the loading of checkpoint files and a replay of the transactions or changes represented by transaction logs to result in a reconstructed database with data equivalent to the database prior to recovery. This recovery process can be lengthy and causes issues of downtime for services seeking to use the database while the database is replaying transactions.

BRIEF SUMMARY

In some embodiments, a computer-implemented method includes accessing a plurality of log records describing a plurality of prior transactions and separating the plurality of log records into sequential segments of log records. A synchronization data structure is generated that constrains execution of a first transaction of a first segment until after at least a second transaction of the first segment based at least in part on a stored indication, in the synchronization data structure. The first transaction of the first segment is executed at least in part by accessing the synchronization data structure to constrain playback of the first transaction until after the second transaction. The resulting values are regenerated by executing other transactions of the sequential segments. The regenerated resulting values are stored as a replacement set of data and data management service access is provided to the replacement set of data.

In one embodiment, a computer-implemented method includes accessing a plurality of log records describing a plurality of transactions that were executed in a first occurrence over a plurality of sessions with one or more data management services that manage a set of data. After the first occurrence the set of data includes resulting values. The method also includes separating the plurality of log records into sequential segments of log records and, for a first segment of the sequential segments, generating a synchronization data structure comprising a stored indication associated with a first transaction of the first segment, wherein the stored indication is applied to constrain execution in a second occurrence of a first transaction of the first segment until after execution of at least a second transaction of the first segment, wherein the stored indication indicates a first state of a portion of the set of data that, prior to the second occurrence of the second transaction, satisfies the second transaction but not a second state that satisfies the first transaction. States of portions of the set of data stored in the synchronization data structure concurrently satisfy at least two transactions even though the at least two transactions occurred, in the first occurrence, in a particular order. The method also includes executing the first transaction of the first segment in the second occurrence at least in part by accessing the synchronization data structure to constrain playback of the first transaction until after the second transaction without constraining playback between the at least two transactions. The method also includes regenerating the resulting values by executing other transactions of the sequential segments in the second occurrence. At least some transactions of the other transactions are executed in a different order in the second occurrence than in the first occurrence. The method also includes storing the regenerated resulting values as a replacement set of data and providing data management service access to the replacement set of data.

In a further embodiment, the computer-implemented method further includes detecting a failure among the one or more data management services. At least executing, regenerating, and storing are performed in response to detecting the failure.

In a further embodiment, the portion of the set of data is a data block of a plurality of data blocks. The first transaction and the second transaction may access a same data block and the at least two transactions may access different data blocks.

In a further embodiment, constraining playback of the first transaction until after the second transaction includes accessing the synchronization data structure by a first thread to determine that the portion of the set of data is not in the second state and based at least in part on determining that the portion of the set of data is not in the second state, executing another transaction of a subset of transactions assigned to the first thread. Constraining playback of the first transaction until after the second transaction also includes, after executing the other transaction of the subset of transactions assigned to the first thread, accessing the synchronization data structure again by the first thread to determine that the portion of the set of data is in the second state and, based at least in part on determining that the portion of the set of data is in the second state, executing the first transaction.

In a further embodiment, the computer-implemented method further includes further constraining execution of transactions in the second occurrence based at least in part on when an index was modified in the first occurrence.

In a further embodiment, the computer-implemented method further includes generating one or more dictionaries of one or more compressed tables from the first occurrence and using the one or more dictionaries in the second occurrence to validate a log record of the transaction.

In a further embodiment, the computer-implemented method further includes capturing a checkpoint of the set of data and starting the regenerating of the resulting values from the checkpoint.

In a further embodiment, separating the plurality of log records into sequential segments of log records uses delimiters to separate log records based on space consumed by the log records.

In a further embodiment, log records of a single database session are spread over a plurality of segments.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 1 illustrates a flow chart of an example process of database recovery.

DETAILED DESCRIPTION

Figure 2:
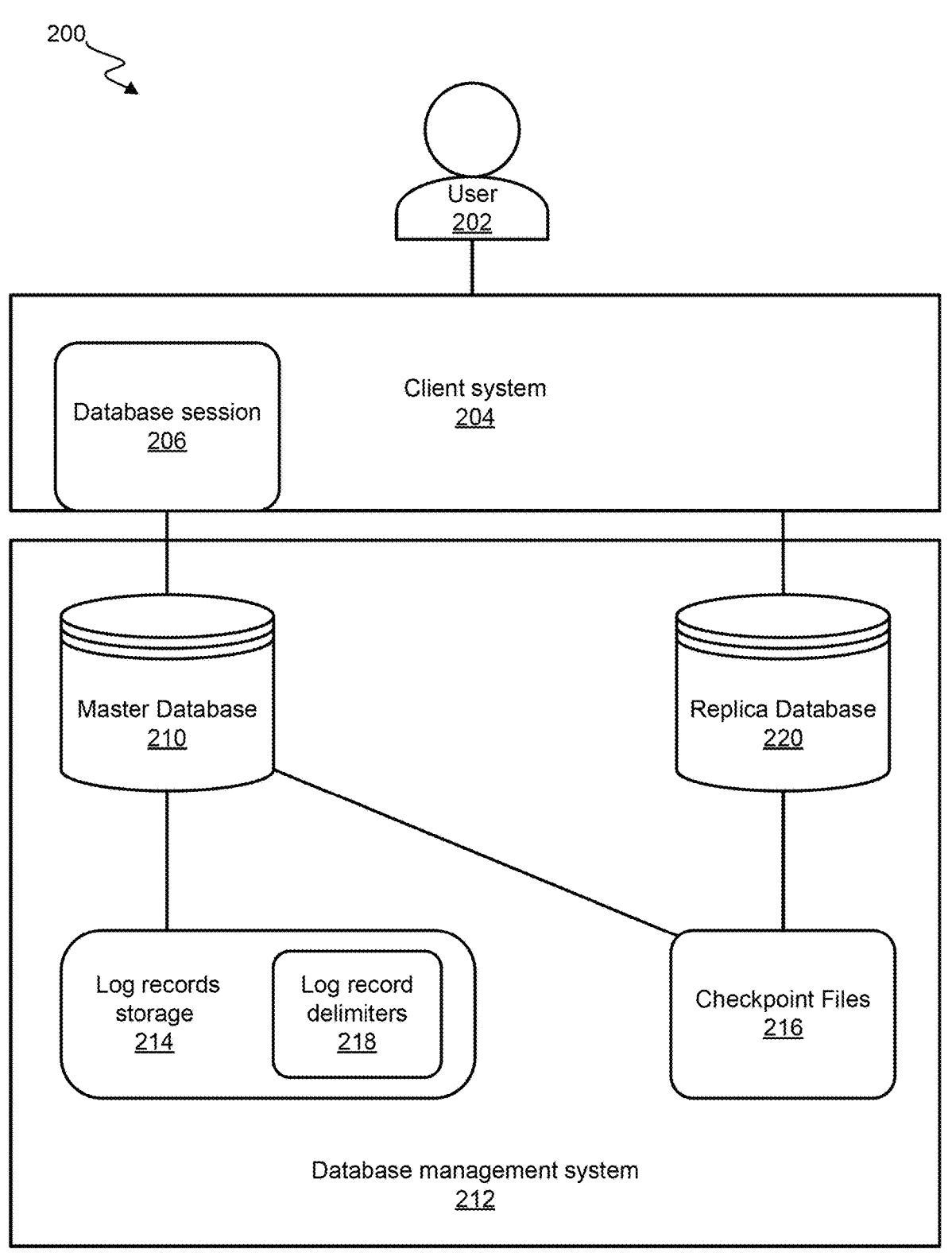
FIG. 2 illustrates a system diagram showing an example cloud infrastructure for performing database recovery.

Methods, systems, and computer-readable media are provided for processing log records of prior transactions by separating the log records into sequential segments with synchronization data structures included to constrain the order of execution of log records within the segments. The log records are processed in accordance with the order of the synchronization data structure and resulting values are regenerated and stored as replacement data with provided data management service access.

The database recovery process may be implemented on a local or cloud-based computer system that includes processors and storage for handling automated (e.g., without requiring human involvement to verify that recovery should be initiated or that recovery was successful) or semi-automated (e.g., including a human-in-the-loop to verify that recovery should be initiated or that recovery was successful) database recovery.

A description of the database recovery system is provided in the following sections:
CONSTRUCTION OF DATABASE RECOVERY FILES
DATABASE RECOVERY PROCESS
CONSTRUCTING TRANSACTION LOG REDO SEGMENTS
LOG RECORD ORDERING CONSTRAINTS AND BLOCK CATALOG
PARALLELIZED RECOVERY PROCESS.
PARALLEL PROCESSING OF LOG RECORDS BY REDO THREADS
COMPUTER SYSTEM ARCHITECTURE
The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Construction of Database Recovery Files

In-memory database recovery is implemented to allow a database stored in memory to be reconstructed after a failure or shutdown of the database. In-memory database recovery may include the storage and loading of checkpoint files and transaction logs. Checkpoint files represent the database state at a previous time. As checkpoint files are costly to create and quickly become out of date, transaction log records of each of the edits made by transactions performed on the database state since the last checkpoint file creation are used to create a record of the database state. The transaction log records can be used to modify a database state loaded from a checkpoint file by replaying transactions, or modifications to the data of the database, represented by the transaction log records to produce the final database state as the database existed prior to the failure or shutdown.

Transaction log records comprise data about blocks of data of the database and modifications to the values of those data blocks that occurred when processing prior transactions. Transaction log records are generated when a database session submits a request to the database comprising a transaction for the database to carry out. Each operation processed by the database from a transaction may generate zero or more transaction log records to record the actions performed for the transaction or the changes made to the database state. Transactions are logged on the database level with transaction log records either transaction by transaction or as sets of transactions. In order for a transaction to be marked as complete, a log record for the transaction is recorded. Implementation of a recovery process involving checkpoint files and transaction log records can take a significant amount of time if each transaction log record is replayed strictly in the order the transaction log records of the transactions were recorded, which is one approach to ensuring proper values for a recovered database state.

Checkpoint files comprise a snapshot of the entire in-memory database state at the time the checkpoint file is created. From a checkpoint file, the in-memory database state may be restored to the previous consistent state at the time the checkpoint file was created. Transaction logs are records that capture all changes made to the database state present in storage devices and can be used to replay those changes in the event of a failure. A transaction log may be created for each transaction or change to the in-memory database state. Transaction logs may be created and stored, recording each transaction that occurred since a last checkpoint file that was created. Transaction logs enable the database state to be restored to a point in time just prior to the failure, ensuring that data is not lost, and the database can continue to function properly.

When a client process connects to the database in a new database session, the client process may be assigned a connection ID. The connection ID may be associated with any actions or records of the client process while the client process uses the database session. For each transaction, or edit to the database state, a transaction log record may be recorded. A counter or other metadata may be initially stored or later determined in association with the database session that records the number of transactions that are recorded in the stored transaction log records for the session. Each transaction log record may also receive a number or transaction identifier identifying the transaction log record. The transaction ID may include information about the connection ID of the database session and the current value of the counter or the value of another number, sequence, or commit unit of the transaction log record. A transaction of the database session may be a commit of changes to the database or a rollback to a database state represented by prior changes. A commit or rollback action or another transaction may be assigned a commit number. When a process disconnects from a database session, the connection ID may be used for another client process to commit changes to the database.

A client process may interact with a master database in a database session. Within a database session, a client process may generate one or more transactions comprising zero or more accesses to one or more data objects of the master database. Each access to one or more data object may be recorded within one or more transaction log records. Each transaction may comprise multiple transaction log records and each database session may generate multiple transactions. An access to a data object may comprise a read action on a data object of the database, in which case a transaction log record for the read action may or may not be created. A transaction may comprise an action which involves multiple data objects, such as a PL/SQL statement, in which case the transaction may generate multiple transaction log records, some of which may contain a dependency on other transaction log records that modify same objects. After a client process is finished with a database session, the client process may close the database session, in which case any connection or connection ID associated with the database session may be re-used for a future database session of the same or different client process.

Transaction logs, checkpoint files, and other relevant data are stored in a stable or non-volatile storage such that the transaction logs, checkpoint files, and other relevant data are not lost when the system crashes or loses power. Data is read from the stable storage during operations to recover the IMDB such as during startup, crash recovery, recovery from backup, or instantiation from a duplicate process for replication. During recovery, a checkpoint file stored in the stable storage is read to establish a state of the database at the time represented by the checkpoint file. If any transaction logs exist that reflect transactions after the checkpoint time but before the target time, the transaction logs may then be replayed from the time of the checkpoint to so as to create an up-to-date and transactionally consistent memory image of the database state.

Database Recovery Process

The contents of the master database may be duplicated to a backup or replica database. When the master database is invalidated, such as due to an error, the master database is validated again by reconstructing the master database from a replica or backup database and transaction log records. When a master database is invalidated, client processes may not be able to interact with the master database while the recovery process is performed. The recovery process should be performed quickly and efficiently as the database session, the client process, or other downstream processes in a data pipeline that rely on the client process may have response time constraints for their sessions with the master database that could timeout and/or potentially cause downstream failures in the data pipeline if the recovery process is not performed quickly. Nonetheless, sequential recovery processes on high throughput databases could take hours using sequentially replayed workloads.

The replay or redo process includes reading transaction log records from the transaction log files and executing a redo callback operation on each log in sequence and updating the IMDB accordingly. The operations are re-executed to ensure that block accesses performed against an original database may be replayed to restore a state of the database that reflects the last transaction log record replayed. Transaction log records may be replayed in the order in which they were written or any other order that preserves dependencies between transaction log records, which are conditions where transaction log records access the same block of data in a manner that affects the final data if not chronologically performed in the same order. After replaying transaction log records, integrity checks may be performed to ensure data consistency. The database management system may then rebuild indexes and write a new checkpoint file to stable storage to facilitate a more efficient future recovery if needed.

In order to perform recovery more quickly and efficiently, the transaction log records may be replayed in parallel by multiple worker threads rather than performing the entire process serially on a single thread. However, in order to replay transaction log records in parallel without creating transactional inconsistencies, the replay of transaction log records is parallelized in a way that compensates for or preserves dependencies between transaction log records that could impact a recovered state of the database. In order to parallelize transaction log record replay such that dependencies are preserved, transaction log records may be grouped together in segments of transaction log records to be performed by a plurality of parallel threads where the segments are constructed to limit or prevent dependencies on transaction log records of a later-processed segment.

Constructing Transaction Log Redo Segments

While the IMDB is operational, transaction logs are recorded regularly or in response to certain changes to the IMDB. Transaction logs are recorded by constructing the transaction log records and writing the transaction log records to stable storage. When writing a transaction log record, database systems use an area called a log buffer. A log buffer is a temporary storage area within the database system's memory where transaction log records are held before being written to stable storage. The log buffer serves as a buffer to optimize write or read operations. For write operations, the log buffer improves performance by allowing multiple transactions to write transaction log records concurrently without immediately requiring disk access for the write operations. For read operations, the log buffer improves performance by allowing log records to be read from the log buffer without having to read the log records from disk.

Transaction log records may be recorded in one or more strands of transaction log records. Each strand may be a plurality of transaction log records. Transaction log records may be recorded to a strand based on methods for storing data efficiently and may therefore not be stored consecutively or in the same strand with transaction logs of the same transaction, the same database session, or in the same strand as other transactions of other database sessions that occurred close in time. A database management system may assign transaction logs of a single database session or connection ID to be written to one or more strands with another database session or connection ID being assigned to one or more other strands for which transaction logs are written. In this way the transaction logs of each concurrent database session may be written concurrently to the separate strands without causing interference to the writing of other transaction log records. In one embodiment, all strands are stored in a single file, such as in the TimesTen® relational database by Oracle Corporation. In another embodiment, log records of different strands may be stored non-contiguously and potentially stored in separate locations such as on separate storage media. Related log records or log records impacting same database structures may be stored with metadata to indicate the location of other related log records stored among the various strands.

Each transaction log record may be assigned to a log segment during or after recording the transaction log record. A segment may be one subsegment of a plurality of subsegments comprising a parent segment. Each log segment comprises a plurality of transaction log records of which some transaction log records of the plurality of transaction log records might not contain a dependency and thus may be performed in parallel. Log segments may be generally constructed such that transactions of log records of a first log segment all occurred prior to transactions of log records of a second log segment such that the log records of the first log segment may be replayed without any dependency issues to the log records of the second log segment.

A special log record called a delimiter may be used to store information about a log segment. A delimiter may be used to signify the bounds of a segment, and the insertion of the delimiter may be used to indicate a segment to be created or that no further transaction log records should be added to the segment. A delimiter may be inserted in association with each transaction log record which designates other transaction log records to be part of the same segment from among the various strands of the transaction log. For example, the delimiter may be inserted immediately after a transaction log record once transaction log records have consumed a certain amount of space. The delimiter may indicate the multiple, non-contiguously stored log records that comprise subsegments from the multiple, potentially separately stored strands of the transaction log. The delimiter may store data for accessing each transaction log record of the subsegment of the transaction log record associated with the delimiter. For example, the delimiter may record the data offset of the further log records within other strands, which may be used to access the further log records. The delimiters may be recorded to the first strand of a set of strands and may be used for accessing data of the other strands of the total set of strands containing transaction log records of the segment. Alternatively, a delimiter may be recorded for each transaction log record of a segment within each of the strands containing each of transaction log records. In one embodiment the delimiters may be readable by a database management system during replay but not by the database session creating the transactions of the transaction log records.

The delimiter may be inserted at a configurable interval of a number of log records, a total size of log records, or an amount of time passed, as such numbers, sizes, or amounts of time are accumulated across log records of all strands. The configurable interval may define the size of the segments the delimiters describe if the insertion of a delimiter is referenced to indicate the creation of a segment or the insertion of a last transaction log record to a segment. For example, a rule may define that a delimiter may be inserted for every 20 megabytes of log record data. The interval by which to insert a delimiter defines the size of a subsegment of log records that may be processed at once. Alternatively, the delimiter may be inserted after the recording of a configurable number of log records. In this case, each delimiter records the location for the same number of log records for each subsegment. In this scenario, unless the log records are of uniform size, a recovery manager would include logic for managing variances in memory consumption by the subsegments and memory allocation needed for the subsegments as they are processed. The log record delimiter may be written regardless of whether the transaction log records of a given subsegment are applied in parallel or in sequence.

Transaction log records of a first segment are designated to be of the first segment by the recording of a first log record delimiter for the first segment. The transaction log records of the segment are all recorded at a time prior to a time $t_0$ of the recording of the first log record delimiter for the first segment. The transaction log records of a second segment are designated to be of the first segment by the recording of a second log record delimiter for the second segment. The transaction log records of the second segment are all recorded at a time prior to a time $t_1$ of the recording of the second log record delimiter but after $t_0$. As such transaction log records of a given subsegment describe transactions recorded prior to the transactions described by transaction log records of a later subsegment and do not depend on transaction log records of a later subsegment.

Figure 4:
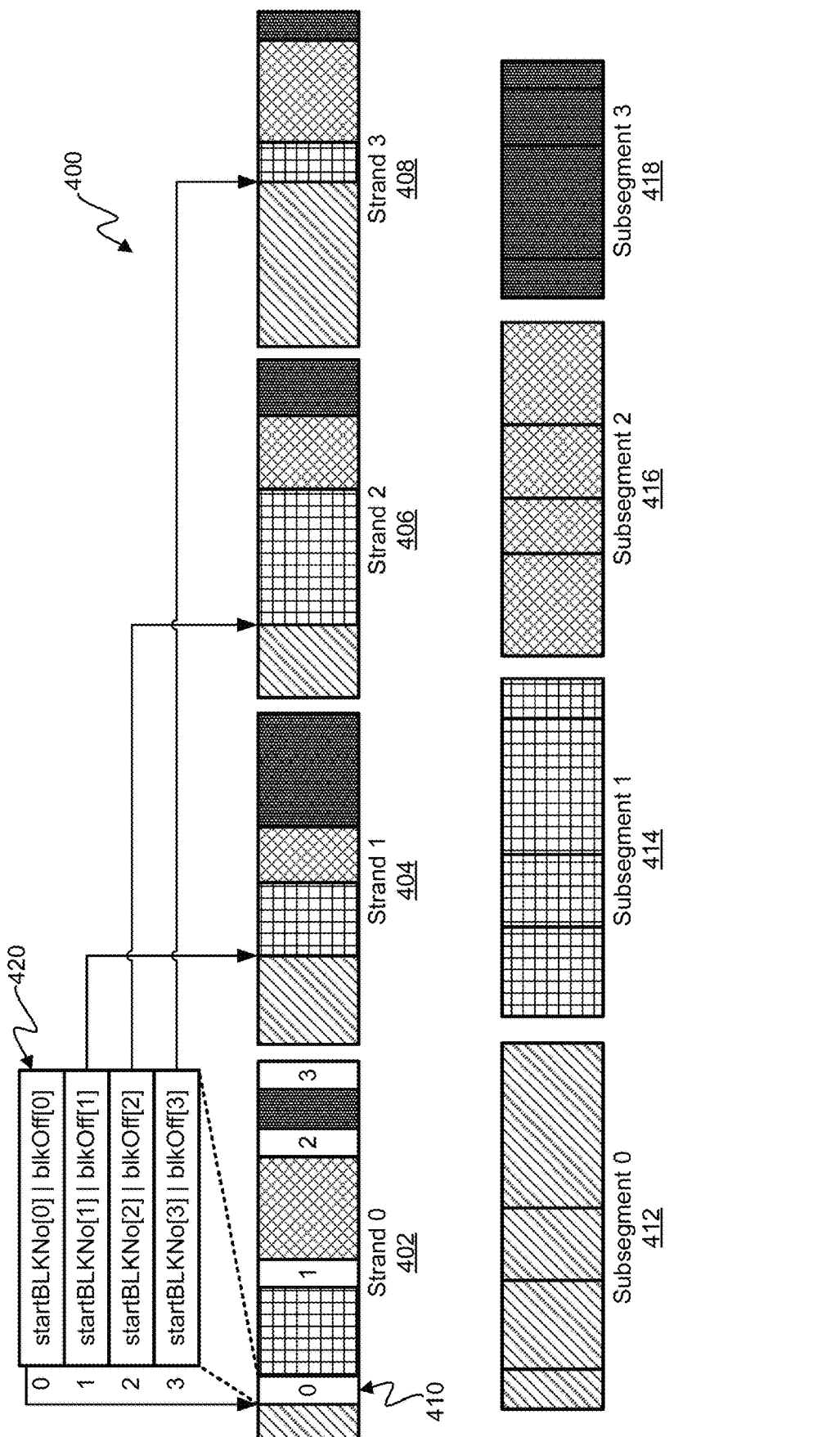
FIG. 4 illustrates a diagram of the construction of sub-segments of log records.

FIG. 4 depicts a diagram 400 of the creation of subsegments from stored transaction log records. Several strands 402-408 are stored, each comprising a plurality of blocks. Transaction log records depicted in the same pattern were recorded prior to the creation of the corresponding log record 410. Within the first strand 402, a number of log record delimiters 410 are recorded after each of the log records of the first strand 402. Each of the log segment delimiters are used for constructing the subsegments 412-418 by tracking the locations of the log records from among the several strands 402-408. The first log record delimiter 410 contains a number of log record metadata 420 which records a data offset for each of the log records used for constructing the first subsegment 412. Another log record delimiter could be recorded for each of the subsegments within each of the several strands 402-408, The first subsegment 412 is constructed by accessing the first log record delimiter 410 and using the log record metadata 420 to access each of the log records of the other strands 404-408. The log records of the first subsegment 412 may then be replayed in parallel with constraints that revert to serial execution when later transactions are attempted to be replayed before an earlier transaction that modified the same data structure and from which the later transaction depends. After or during processing the log records of the first subsegment 412, the second subsegment 414 may be accessed as determined from another log record delimiter. The second subsegment 414 or later subsegments may be prepared for further processing, with transactional dependencies and ordering determined, while the first subsegment 412 is being replayed according to dependency constraints.

FIG. 2 depicts a diagram of a distributed system 200 for performing database management. A user 202 may interact with a client system 204 to access data on a database. The client system 204 establishes a database session 206 with the master database 210 so that the user's 202 access to data on the database may be carried out. A database management system 212 records edits made to the master database 210 within the database session 206. Edits made to the master database 210 are recorded as transaction log records in a log record storage 214. As enough changes are made or at a regular interval, the database management system 212 records checkpoint files 216 storing the current stat of the master database 210. The database management system 212 records, along with transaction log records, log record delimiters 218 within the log record storage 214. A log record delimiter may be recorded to the log record delimiters 218 after recording a pre-determined number or total size of log records in the log record storage 214. The database management system 212 may also maintain a number of replica databases 220. A replica database 220 may be used to establish new database sessions when the master database 210 is currently inaccessible by the client system 204.

Log Record Ordering Constraints and Block Catalog

In order to properly reconstruct the database state with data values equivalent to the database prior to failure or shutdown, transaction log records are replayed in a process following ordering constraints to replay the log records in the correct order. Parallel redo of transaction log records reduces the number of ordering constraints for the redo process to block access ordering and transactional ordering. Transactional ordering is defined as follows: given a first log record and a second log record within the same transaction, the first log record precedes the second log record if the first log record was written before the second log record; given a first log record and a second log record within the same transaction, the first log record precedes the second log record if the first log record started before the second log record; given a first transaction and a second transaction written by two different database connections, the transactions are considered concurrent if no log records of the two transactions modify the same block; and a first transaction precedes a second transaction if every log record of the first transaction was logged before every log record of the second transaction. Block access ordering consists of checking accesses to a block against a block record which constrains the access to the block to only the next sequential version number of a block ID for the block. In this manner, transactions that access or write to the same block or data may be constrained to sequential execution; whereas, transactions that access or write to different blocks or data may be executed in parallel such that replay or redo of these transactions may occur in a same or different order than originally executed prior to failure.

A block catalog may be generated that records version information for the blocks referred to in a redo segment. The block catalog is an example of a synchronization data structure that may be used to enforce data dependencies in accesses to the same set of data, such as accesses to the same block, by providing information on the accesses to the blocks that may be compared to the transaction log records being replayed. Although various examples of the block catalog are provided for block-level access management during redo, data may be divided into other sets of data at a granularity higher than block-level, lower than block-level, or otherwise different than block-level in other embodiments. The block catalog may be generated as a first step to processing a subsegment. A block catalog may track, for an individual segment, the data storage units of the database, indexes, and dictionaries for compressed tables. For each data block tracked by the block catalog, the block catalog stores a block ID to track the order of modifications to that block. As transaction log records are processed, the block ID for each block accessed by a transaction log record is updated. The block catalog may be a lock-free shared data structure, such as a table, so that concurrently executing worker threads may update the block catalog for different accessed blocks at the same time. The same block would not be accessed concurrently by different transactions, as versions maintained in the block catalog allows only the worker thread with the lowest version number for that block to make changes to the block catalog. The block ID may be a single integer, in which case the transaction log records that modify the block are each assigned an integer in ascending order (versions 1, 2, 3, 4, 5, etc.) with the first transaction log record of the chain of dependency having the lowest version number. As described herein, a tuple of a block ID or other identified portion of a dataset and a version number may serve as an example "state" of a block of data or other portion of a data set during replay. For example, the state of the block may progress as transactions are replayed against the block and the version number increases. Other blocks or portions may also progress concurrently as transactions are replayed against the other blocks or portions and the block catalog is updated. The block ID is then initialized to a number sequentially lower than the lowest version number assigned to a transaction log record. The block catalog may be initialized for each subsegment as a tuple of values, such as with the lowest version of the block version number and serial number as the block ID for each block modified by transaction log records in the subsegment. In this method, changes to the size of the block may be tracked using the serial number where the version number is incremented and the serial number is reset to zero when changing the size of the block, and incrementing the serial number for transaction log records that do not change the size of the block but modify the value of the block. By using the lowest version for a block ID, this indicates that every block access from a previous segment is already applied or that the checkpoint contains a more recent version of the block. For transaction log records that involve multiple blocks, these log records contain the versioning information for all the blocks they depend on and modify. For example, if a transaction log record merges or splits blocks, the transaction log record contains a list of block ID, version number, or serial number for each block consumed or created in the action. Block IDs for any blocks created by transaction log records are also included in the block catalog. In the case of merges of multiple blocks, a dependency on multiple other log records may be recorded.

The block catalog may also track indexes for each subsegment as well as dictionaries for compressed tables to track changes to these data structures as changes to these data structures may not be tracked by transaction log records. Indexes and dictionaries are tracked to determine if these are consistent at the end of the redo process as they may not be tracked in the database structure. An index ID may be initialized with a next log write number where the index is modified and a number of log records to apply per log write number. This index ID may be incremented as log records are replayed and changes to the index are defined by various log records. The block catalog may also store a list of the tables that use compression and were updated during the redo process to recreate their dictionaries after redo is done. A block catalog may also be used for referencing the data blocks of the database as the database blocks may not be instantiated at the time they need to be referenced due to the parallel method of processing log records. Similarly, the stored indexes and dictionaries for compressed tables may be referenced via the block catalog as they may not yet be instantiated at the time of request.

For transactions that insert into a table, these transactions could be scheduled for redo prior to transactions that create the table without violating block access order. As such, log records that involve tuple operations or insertions to tables cause an extra verification step to determine if the access recorded in the log record is to a valid table structure and if not, recording a dependency for the log record. Within the parallel redo process an index heap may be destroyed before applying a drop/delete index log record without violating block access order. In order to enforce block access order for drop/delete index log records, a new log record may be created and a dependency is recorded from the destruction of the index heap to the new log record and from the new log record to the drop/delete index log record such that the block access order of the new log record's dependencies enforces the ordering between the destruction of the index heap and the drop/delete index log record. In order to enforce block access ordering for any tuple operations on indexes such as creation, drop, or dirty operations, a log record may be created for each of these operations within the log records with a log write number as a version number for the block ID and a number of pending log records for the index in the current log write number as the serial number for the block ID.

A log record header may also be generated that records information about the transaction log records in the current redo segment. The log record header may store for each transaction log record, an identifying number for the transaction log record, such as a log record ID, a serial number for the transaction log record recording the order of the log records within the transaction, the block IDs of any blocks accessed by the transaction log record, and a block version number for the blocks accessed by the transaction log record.

Figure 7:
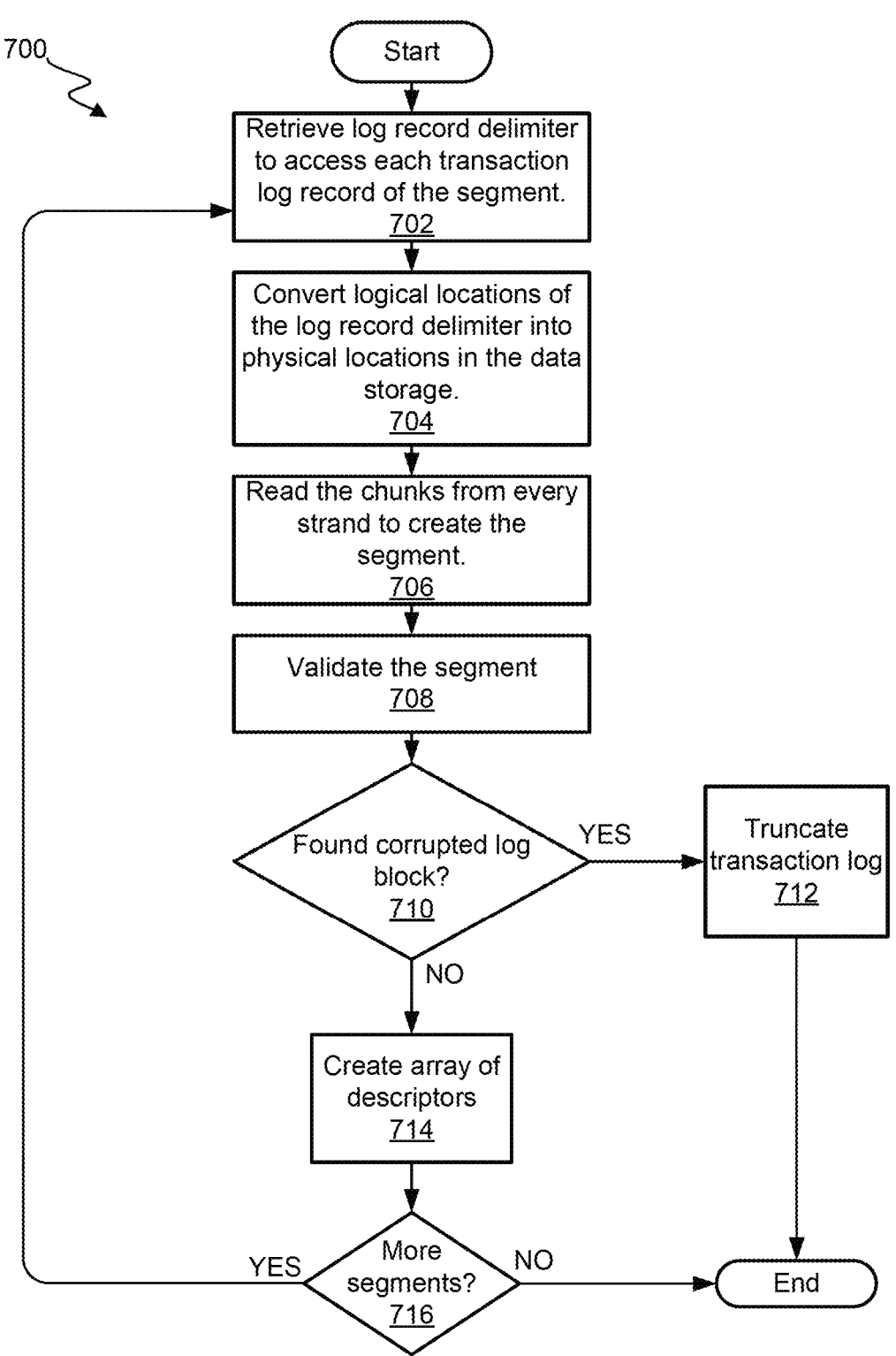
FIG. 7 illustrates a flow chart of an example process for creating a log segment descriptor.

FIG. 7 depicts a flowchart diagram for a process 700 for creating a log segment descriptor. At block 702 a log record delimiter is retrieved to access each transaction log record of the segment. At block 704, the logical locations of the log record delimiter are converted into physical locations in the data storage. At block 706, the system reads the chunks from every strand to create the segment. At block 708, the segment is validated based on the currently read chunks. At block 710, if a corrupted log block is found, at block 712, the transaction log is truncated and the process 700 ends. If no corrupted log blocks are found, the system, at block 714, an array of descriptors is created. The system then checks if there are further segments to perform the method for, and if so, the process 700 is performed again for the new segment. The process 700 may be performed simultaneously or in parallel with another process, such as the process 600 or the process 800.

Figure 5:
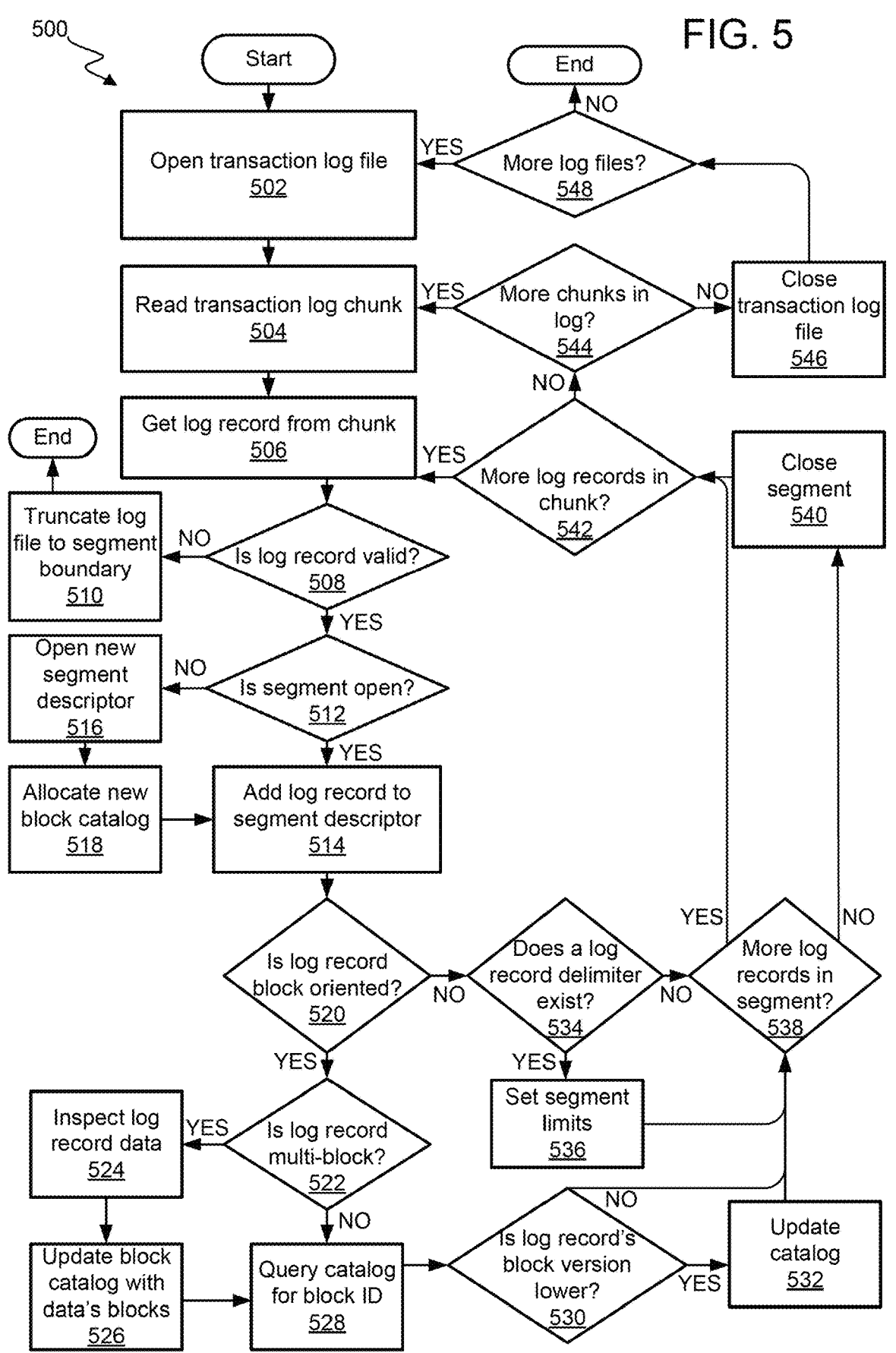
FIG. 5 illustrates a flow chart of an example process for creating subsegments and the block catalog.

FIG. 5 depicts a flowchart diagram for a process 500 for creating subsegments and the block catalog. At block 502, a transaction log file is opened. At block 504 the transaction log chunks are read through to gather information about the transaction log records. At block 506 a transaction log record is selected from the chunk. The transaction log record is then analyzed, at block 508, to determine if the transaction log record is valid. If the transaction log record is not valid, the log file is truncated to the segment boundary at block 510 and the process ends. If the transaction log record is valid then the database management system determines, at block 512, if there is an open segment to receive the transaction log record. If there is an open segment, the transaction log record is added to the segment descriptor at block 514. If there is no open segment, then a new segment descriptor is opened at block 516 and a new block catalog is allocated at block 518, before the transaction log record is added to the new segment descriptor at block 514. The system then determines if the transaction log record is block oriented at block 520. If the transaction log record is block oriented, the system then determines at block 522 whether the transaction log record is multi-block. If not, then at block 528 the catalog is queried for the block ID. If so, then the transaction log record data is inspected at block 524 and the block catalog is updated with the data's blocks at block 526 before the catalog is queried for the block ID at block 528. The system then determines, at block 530, if the transaction log record's block version is lower than the version of the block catalog. If so, the block catalog is updated at block 532 before moving to block 538. If the transaction log record's block version is lower, than the process moves straight on to block 538. If the transaction log record was not block oriented, then the system determines if a log record delimiter exists at block 534. If not, the process moves on to block 538. If so, the system sets segment limits at block 536 before moving to block 538. At block 538, the system determines if there are more transaction log records in the segment. If not, the segment is closed at block 540. If so, the system determines, at block 542, if there are more transaction log records in the chunk. If so, the process is restarted at block 506 with the new transaction log record. If not, the system determines if there are more chunks in the total log at block 544. If so, then the transaction log of another chunk is read at block 504 and the process repeats. If not, then the transaction log file is closed at block 546 and the system determines if there are any remaining log files at block 548. If not, the process ends. If so, then the process starts over at block 502 by opening the new transaction log file.

Parallelized Recovery Process

The parallel redo process begins by loading the most recent checkpoint file. After loading the checkpoint file, the transaction logs are searched to determine the most recent transaction log after the time of the checkpoint file to act as the first transaction log for replay. Once the first transaction log for replay is selected, the transaction logs may then be replayed to restore the state of the database to the most recent point prior to failure. In order to improve the process of replaying transaction logs, transaction logs may be replayed in parallel where there is no dependency issue between transaction logs.

In order to process transaction log records in parallel, transaction log records that do not contain dependencies on each other within the same subsegment are processed in parallel. A first subsegment of log records is accessed by loading the subsegment into memory to access the transaction logs of the subsegment for replay. In order to access the subsegment for a given transaction when processing transaction log records, the log records of a given transaction may be accessed by accessing a delimiter which indicates the location of other transaction log records of the same subsegment.

Parallel redo consists of recovering a segment of the transaction log at a time, reapplying the transaction log records within the segment in a concurrent way analogous to the order in which concurrent transactions originally inserted the transaction log records during normal processing, or otherwise consistently with ordering constraints as described in the section entitled, "LOG RECORD ORDERING CONSTRAINTS AND BLOCK CATALOG." A redo cursor advances through the transaction log records and selects transaction log records to be replayed. The redo cursor may select transaction log records of a subsegment based on the log record delimiter. The redo cursor may move quickly through the transaction log records as the redo cursor may select log segments of a subsegment without sorting the transaction log records within the subsegment in processing order.

Processing of transaction log records is performed by redo track threads, which may each be one thread of a plurality of threads working in parallel on a CPU. The redo track threads may each select a transaction log record to process of the current subsegment as other redo track threads are processing further transaction log records of the current subsegment. A redo track thread processes transaction log records by sorting and replaying the transaction log records of the current redo segment. Replay of a transaction log record comprises performing an operation on data blocks, where the operation to perform and the identity of the data blocks are stored in the transaction log record.

Any two transaction log records of a subsegment may or may not contain a dependency and thus may or may not be able to be processed in parallel. A first unprocessed transaction log record of a subsegment has a probability that there does not exist a second unprocessed transaction log record of the subsegment where the first unprocessed transaction log record contains a dependency on the second unprocessed transaction log record. Whenever it is true that the first unprocessed transaction log record does not contain a dependency on a second unprocessed transaction log record, the first unprocessed transaction log record may be performed in parallel with one or more other transaction log records. On average, the transaction log records of a subsegment may be processed within approximately the same time as to process the longest chain of transaction log records with dependencies within the subsegment. As subsegments are constructed based on when the transactions of the transaction log records were recorded to the database and subsegments are processed in transaction order, the transaction log records of a current subsegment are unlikely to contain a dependency on transaction log records of a subsegment that is yet to have been processed. When processing transaction log records of a subsegment, the transaction log records of the subsegment may be ordered in transaction order, that is, in the order in which the transaction that the transaction log records describe were recorded to the database. In this way, transaction log records of a subsegment may be processed in an order that minimizes the probability that any given transaction log record contains a dependency on an as of yet unprocessed transaction log record. The transaction log records may be ordered in transaction order such as by using information in the transaction log headers such as the connection ID, the transaction counter, transaction ID, or the log record number associated with each transaction log record.

After accessing each of the transaction log records for a given subsegment, and optionally organizing the transaction log records, each transaction log record is assigned a version number based on their transaction order. A number of log records are determined to be parallelizable based on dependencies between the transaction log records of the subsegment. A transaction log record may be determined to not contain a dependency by comparing a version number of the transaction log record to the block ID of the block modified by the transaction log record within the block catalog. A transaction log record does not contain a dependency when the version number of the transaction log record is a next sequential version of the block ID of the block modified by the transaction log record. When a transaction log record is determined to not contain a dependency, the transaction log record may be processed by a redo thread and the block ID of the modified block is updated to the version number of the transaction log record. Multiple worker threads can modify data of the database simultaneously as they are excluded, by the implicit locking mechanism of the block ordering, from modifying the same block at the same time or out of order such that an explicit locking mechanism is not necessary. The redo thread may be selected to process the transaction log record when a non-dependent transaction log record is determined, or the redo thread may select the next transaction log record of the subsegment and perform the analysis of whether the next transaction log record contains a dependency.

Parallel Processing of Log Records by Redo Threads

A transaction log record may be processed in parallel with a transaction log record previously selected by another redo thread by determining the transaction log record also does not contain a dependency and processing the transaction log record while another redo thread is still processing the previously selected transaction log record. A plurality of transaction log records may also be processed in parallel if determined, in advance of processing by a redo thread, that the plurality of transaction log records do not contain a dependency and marking the transaction log records for performance in parallel when redo threads become available for processing the transaction log records. When processing transaction log records, non-transactional log records recorded to the subsegment may be filtered out and not processed by a redo thread. The redo track thread may observe the transaction and block access ordering constraints for the transaction log records. If a transaction log record is selected by a redo thread for processing that contains a dependency, the transaction log record may be recorded to a dependency list of transaction log records for the subsegment for performance after the other transaction log records of the subsegment. The subsegment may be structured as a queue of transaction log records, in which case the dependency list of transaction log records may be the end of the queue of transaction log records. In this way the transaction log record on which the dependency relies may have a chance to be processed prior to reselecting the dependent transaction log record for processing. By continuously setting aside dependent transaction log records of the subsegment for which dependencies have not yet been satisfied, the first transaction log record of a chain of dependent log records may be selected for processing and any non-dependent log records may be processed in parallel. As each subsegment is of a pre-determined length by the configurable insertion of the log record delimiter, dependency chains of log records are limited to be less than or equal to the total length of the subsegment. Parallel redo ends when there are no more transaction log records from the redo segment to reapply.

FIG. 1 depicts a flow chart of a process 100 for processing log segments in parallel. At block 102, a database management system accesses a plurality of transaction log records describing a plurality of transactions that were executed in a first occurrence over a plurality of sessions with one or more data management services that manage a set of data. After the first occurrence the set of data comprises resulting values. At block 104, the database management system separates the plurality of transaction log records into sequential segments of transaction log records. At block 106, for a first segment of the sequential segments, the database management system generates a synchronization data structure that constrains execution in a second occurrence of a first transaction of the first segment until after at least a second transaction of the first segment based at least in part on a stored indication, in the synchronization data structure, of a first state of a portion of the set of data that, prior to the second occurrence of the second transaction, satisfies the second transaction but not a second state that satisfies the first transaction. States of portions of the set of data stored in the synchronization data structure may concurrently satisfy at least two transactions even though the at least two transactions occurred, in the first occurrence, in a particular order. At block 108, the database management system executes the first transaction of the first segment in the second occurrence at least in part by accessing the synchronization data structure to constrain playback of the first transaction until after the second transaction without constraining playback between the at least two transactions. At block 110, the database management system regenerates the resulting values by executing other transactions of the sequential segments in the second occurrence. At least some transactions of the other transactions are executed in a different order in the second occurrence than in the first occurrence. At block 112, the database management system stores the regenerated resulting values as a replacement set of data. At block 114, the database management system also provides data management service access to the replacement set of data.

Figure 6:
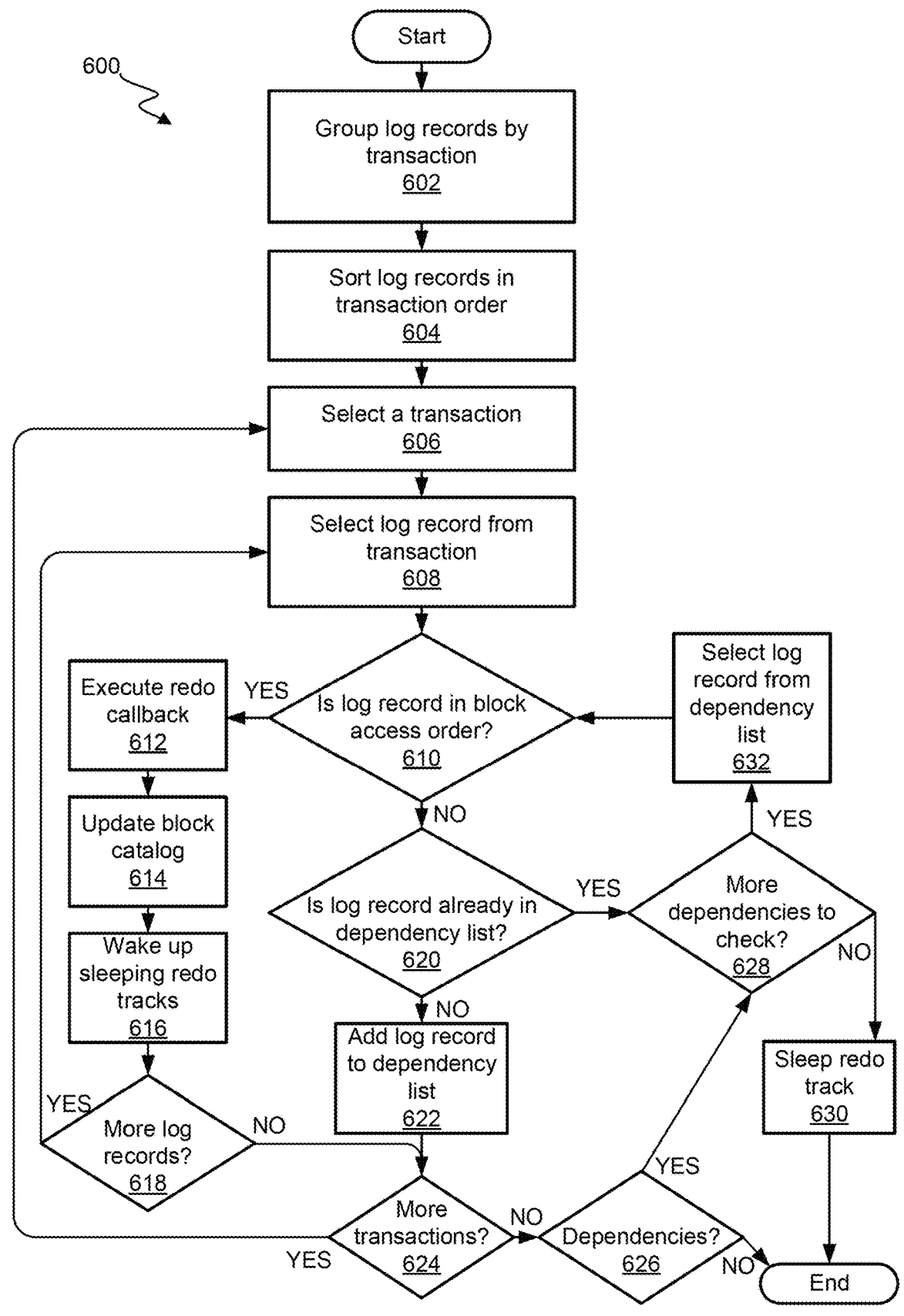
FIG. 6 illustrates a flow chart of an example process for processing log segments.

FIG. 6 depicts a flow chart of a process 600 for processing log segments. The process 600 may be performed, in whole or in part, by multiple threads simultaneously or in parallel. After building the log segments and the block catalog, the log segment is divided into subsegments. Each subsegment is processed in order by the redo tracks, which are the threads that will be applying the changes specified by the transaction log records. At block 602, the log records of a subsection are grouped by transaction. Log records may be grouped based on the connection ID recorded for each record. At block 604, the transaction log records are sorted in transaction order using the connection ID, the transaction counter, and the log record number. The transaction log records are grouped and sorted, and the transaction log records may be processed in parallel with each redo track, at block 606, by selecting a transaction to process. From the transaction, at block 608, a transaction log record is selected by the redo track based on the ordering of the transaction log records. For that transaction log record, at block 610, the process determines if the transaction log record is in block access order by determining if the block ID for the transaction log record in question meets the requirements of the block ID sequencing numbers of the block catalog. If the transaction log record is in block access order, then at block 612, the transaction log record is executed via redo callback. At block 614, the block catalog is then updated and at block 616, a wakeup message is sent to any sleeping redo tracks waiting on the processing of that transaction log record. At block 618, the system then determines if there are more transaction log records to process for the transaction and if so, it repeats at block 608 with a new transaction log record. If the transaction log record is not in block access order, then at block 620, the transaction log record is checked if it already exists in a dependency list. If the transaction log record does not exist in the dependency list, then at block 622 a new entry is added, and the dependency for the transaction log record is recorded. After a dependency is recorded, at block 624, the system determines if there is another transaction for the dependency than the transaction of the transaction log record. If so, then another transaction is selected at block 606 and transaction log records are begun to be processed according to the method so as to cause the previous transaction to wait until the dependency is resolved. The transaction of the dependency may be specifically selected at block 606, such that the dependency is resolved for the previous transaction log record. A new transaction may also be selected if, at block 618, the system determines that there are no further transaction log records for the currently selected transaction. At block 624, if there are no further transactions to process, the system then checks at block 626, whether there are any remaining dependencies recorded in the dependency list. If there are none, the process ends. If there are remaining dependencies in the dependency list, then the method proceeds to block 628 to determine if there are selectable dependencies to check. If there are none, such as in the case that a dependency is listed however the log record or transaction that is required to be processed for the dependency is currently being processed by another redo track, then at block 630 the current redo track is put to sleep until a wakeup message is received. If, at block 628, there are more selectable dependencies to check, then at block 632, a transaction log record that another transaction log record is dependent on is selected from the dependency list and the method repeats at block 610. This same determination, at block 628, may be made if, at block 620, there is already a dependency listed for a selected transaction log record.

The redo track worker thread will sort the log records and transactions in its collection using the transaction order rules and go over the transaction's log records. For every transaction log record in increasing transaction order, it verifies whether the block version from the transaction log record matches the block version in the block catalog and in the database. If they do, the transaction log record is replayed, and the block catalog is updated to reflect the new block version. If it is not, the transaction is considered to have a dependency and a put-on pause by selecting a different concurrent transaction or a different dependency transaction. The process is done when there are no transactions left without processing in the redo track collection.

Figure 8:
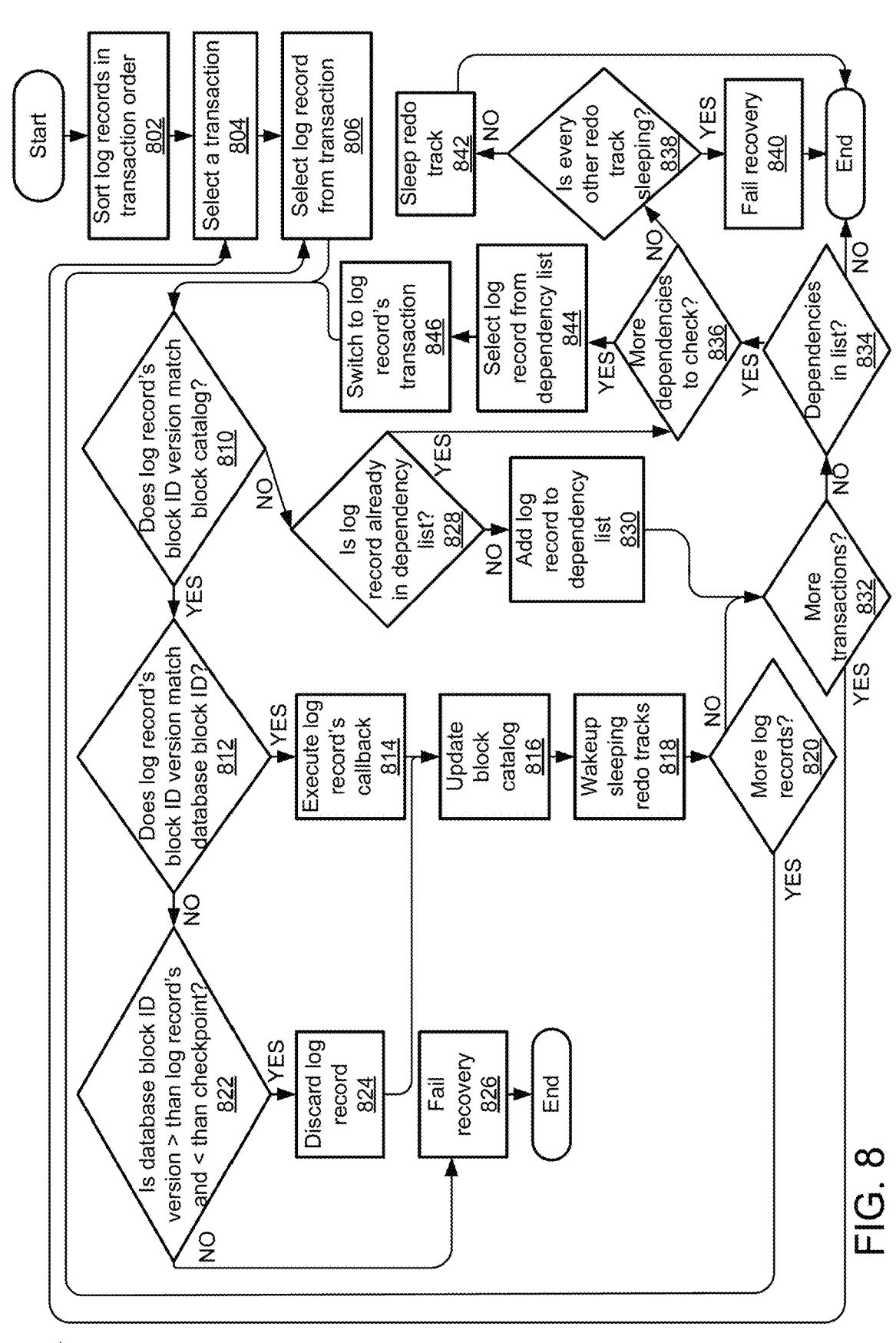
FIG. 8 illustrates a flow chart of another example process for processing log records.

FIG. 8 depicts a flowchart diagram of a process 800 for processing transaction log records. The process 800 may be performed in whole or in part, by multiple threads simultaneously or in parallel. At block 802, the transaction log records are sorted in transaction order. At block 804, a transaction of a set of transactions is selected. At block 806, a transaction log record is selected from the selected transaction. At blocks 810-812 and 822, the transaction log records are categorized based on metadata. At block 810, if the transaction log record's block ID version matches the block catalog, then the transaction log record may be checked at block 812, if the block ID version matches the database block ID. If both are true, then the process moves to block 814, where the transaction log record's callback is executed. Continuing to block 816, the block catalog is updated for the blocks accessed by the selected transaction log record and at block 818, any sleeping redo tracks affected by the execution of the transaction log record are woken up. At block 820, the database management system determines if there are more transaction log records of the transaction to process, in which case the process returns to block 806 to select another transaction log record. If the selected transaction log record's block ID version does not match the database block ID, then at block 822, the database management system may determine if the database block ID is between the transaction log record's block ID and a more recent block ID within a checkpoint. As the checkpoint incorporates each transaction log record from the precious checkpoint to be created, there may be a checkpoint with a more recent block ID of the same transaction log record, in which case the block ID of the current database is expected to be greater than the transaction log record's and less than the version of the checkpoint. If so, then the transaction log record is discarded as unnecessary at block 824. If not, at block 826 fail recovery is executed and the process is ended. If the transaction log record's block ID version does not match the block catalog at block 810, then the process moves to block 828, and the database management system determines whether the transaction log record already is recorded in a dependency list. If not, then the transaction log record is added as a dependency in a dependency list at block 830 and the database management process determines at block 832 whether there are more transactions that may be processed by the current redo track. If so, then the process returns to block 804 to select a new transaction record. The process may also determine if there are more transactions to process at block 832 after determining that there are no further transaction log records to process at block 820. If there are no more transactions to process at block 832, then the database management system, at block 834, determines if there are any remaining dependencies in the dependency list to process. If not, the process is ended as all transaction log records are presumed to be processed. If so, then the database management system determines, at block 836, whether there are more dependencies to check of the dependency list. If not, then the system determines, at block 838, whether every other redo tracks sleeping, if so, the system enters fail recovery at block 840 and the process ends. This is in order to detect a fault that causes all redo tracks to act as if they are waiting on a dependency. If not, the current redo track is put to sleep at block 842 and the process ends. If there are further transaction log records in the dependency list to check at block 836, then a transaction log record of the dependency list is selected at block 844 and the transaction of the selected transaction log record of block 836 is switched to as the current selected transaction at block 846.

Figure 3:
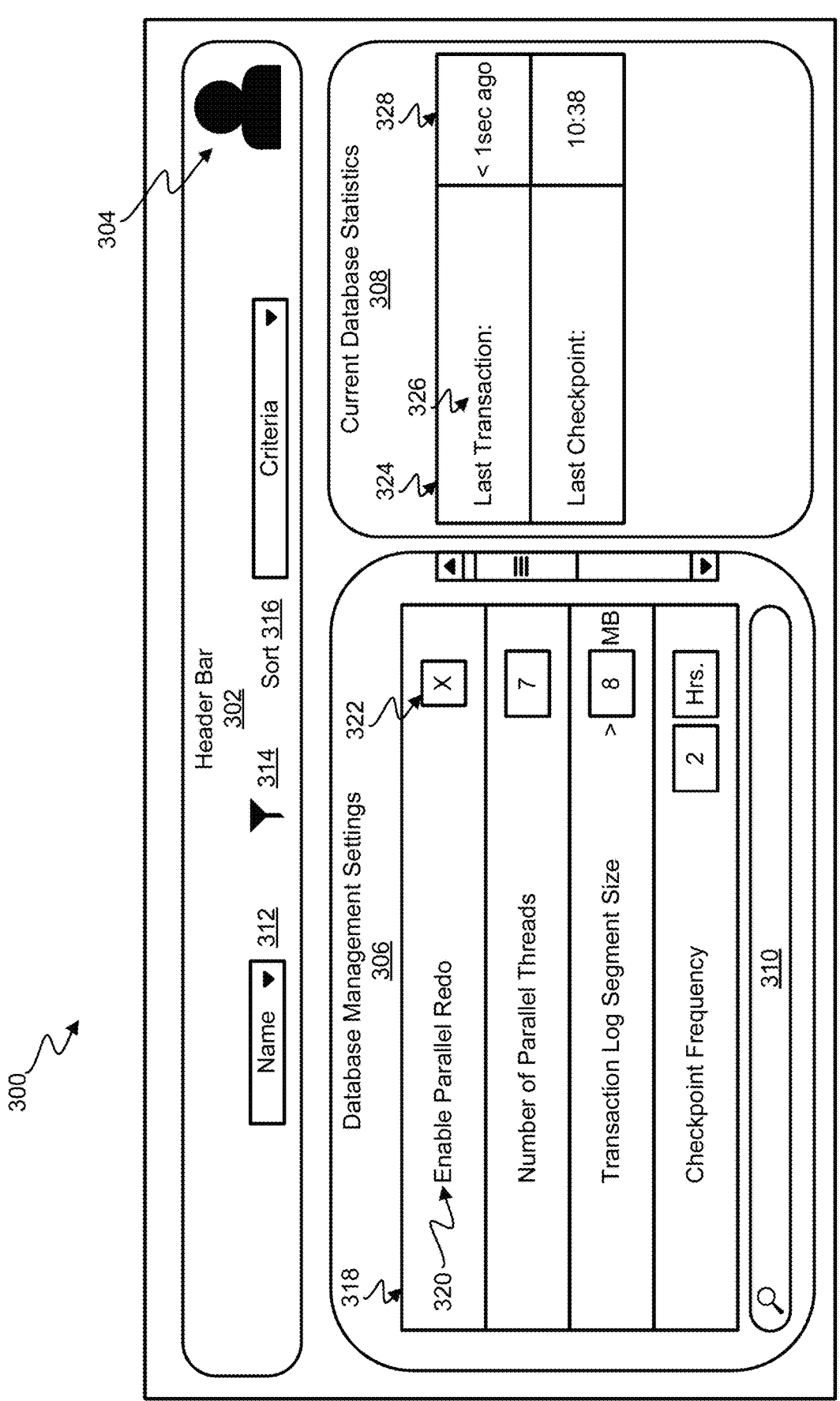
FIG. 3 illustrates a diagram of an example user interface for database management.

FIG. 3 depicts a database management user interface 300. The user interface 300 may contain a number of regions for display of settings 302, 306, and 308. The user interface 300 may detect a user 304 via a set of user credentials. Settings or data of the user interface 300 may be loaded in response to the set of user credentials. The user interface 300 may contain one or more settings 310-316 for navigating the user interface. For example, the user interface, 300 may contain a search function 310, a filter criterion 312, or one or more sorting criteria 312 and 316. The user interface 300 may contain a region for displaying database management settings 306. The region for database management settings 306 may contain one or more settings 318 containing a rule 320 and a user input 322 for determining a behavior within the database management system. The user input 322 may be a toggle for the rule 320 or a value used for determining the application of the rule 320 such as a threshold value. The user interface 300 may also contain a region for displaying current database statistics 308. The region for displaying current database statistics 308 may display one or more database statistics 324. Each database statistic 324 may comprise a label 326 and an output value 328. The database statistic 324 may comprise, for example, a total number of transactions, a total number of log records, a total number of data objects accessed in a transaction log record redo process, a total number of segments of transaction log records, a total number of transaction log records delayed by block ordering, a total time spent reading the transaction log, or a total time spent executing a redo process.

Computer System Architecture

Figure 9:
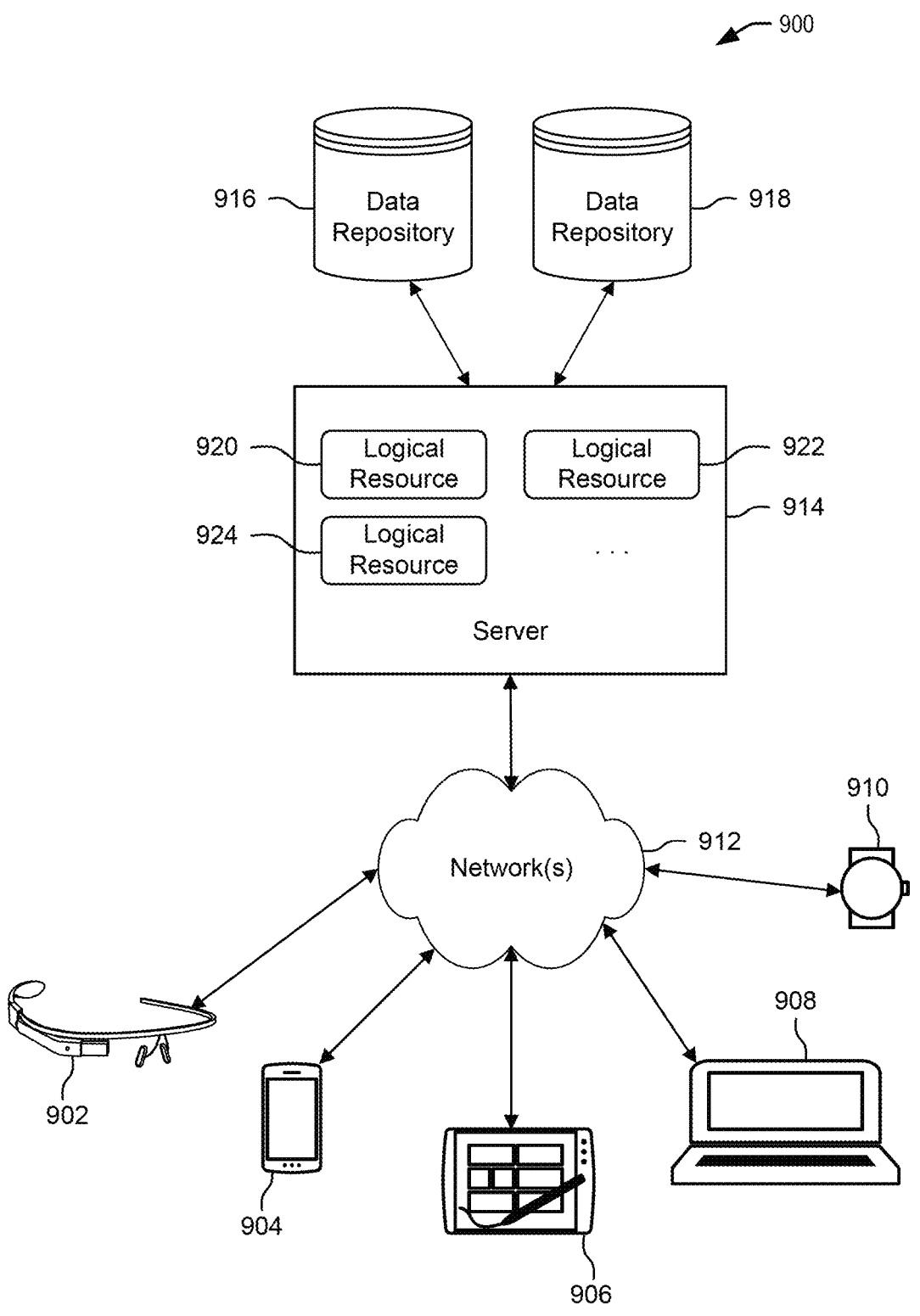
FIG. 9 depicts a simplified diagram of a distributed system for implementing certain aspects.

FIG. 9 depicts a simplified diagram of a distributed system 900 for implementing an embodiment. In the illustrated embodiment, distributed system 900 includes one or more client computing devices 902, 904, 906, 908, and/or 910 coupled to a server 914 via one or more communication networks 912. Clients computing devices 902, 904, 906, 908, and/or 910 may be configured to execute one or more applications.

In various aspects, server 914 may be adapted to run one or more services or software applications that enable techniques for database recovery.

In certain aspects, server 914 may also provide other services or software applications that can include non-virtual and virtual environments. In some aspects, these services may be offered as web-based or cloud services, such as under a Software as a Service (SaaS) model to the users of client computing devices 902, 904, 906, 908, and/or 910. Users operating client computing devices 902, 904, 906, 908, and/or 910 may in turn utilize one or more client applications to interact with server 914 to utilize the services provided by these components.

In the configuration depicted in FIG. 9, server 914 may include one or more components 920, 922 and 924 that implement the functions performed by server 914. These components may include software components that may be executed by one or more processors, hardware components, or combinations thereof. It should be appreciated that various different system configurations are possible, which may be different from distributed system 900. The embodiment shown in FIG. 9 is thus one example of a distributed system for implementing an embodiment system and is not intended to be limiting.

Users may use client computing devices 902, 904, 906, 908, and/or 910 for techniques for database recovery in accordance with the teachings of this disclosure. A client device may provide an interface that enables a user of the client device to interact with the client device. The client device may also output information to the user via this interface. Although FIG. 9 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 912 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 912 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 914 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 914 can include one or more virtual machines running virtual operating systems, or other computing architectures involving virtualization such as one or more flexible pools of logical storage devices that can be virtualized to maintain virtual storage devices for the server. In various aspects, server 914 may be adapted to run one or more services or software applications that provide the functionality described in the foregoing disclosure.

The computing systems in server 914 may run one or more operating systems including any of those discussed above, as well as any commercially available server operating system. Server 914 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 914 may include one or more applications to analyze and consolidate data feeds and/or event updates received from users of client computing devices 902, 904, 906, 908, and/or 910. As an example, data feeds and/or event updates may include, but are not limited to, blog feeds, Threads® feeds, Twitter feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 914 may also include one or more applications to display the data feeds and/or real-time events via one or more display devices of client computing devices 902, 904, 906, 908, and/or 910.

Distributed system 900 may also include one or more data repositories 916, 918. These data repositories may be used to store data and other information in certain aspects. For example, one or more of the data repositories 916, 918 may be used to store information for techniques for database recovery. Data repositories 916, 918 may reside in a variety of locations. For example, a data repository used by server 914 may be local to server 914 or may be remote from server 914 and in communication with server 914 via a network-based or dedicated connection. Data repositories 916, 918 may be of different types. In certain aspects, a data repository used by server 914 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 916, 918 may also be used by applications to store application data. The data repositories used by applications may be of different types such as, for example, a key-value store repository, an object store repository, or a general storage repository supported by a file system.

In one embodiment, server 914 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 10:
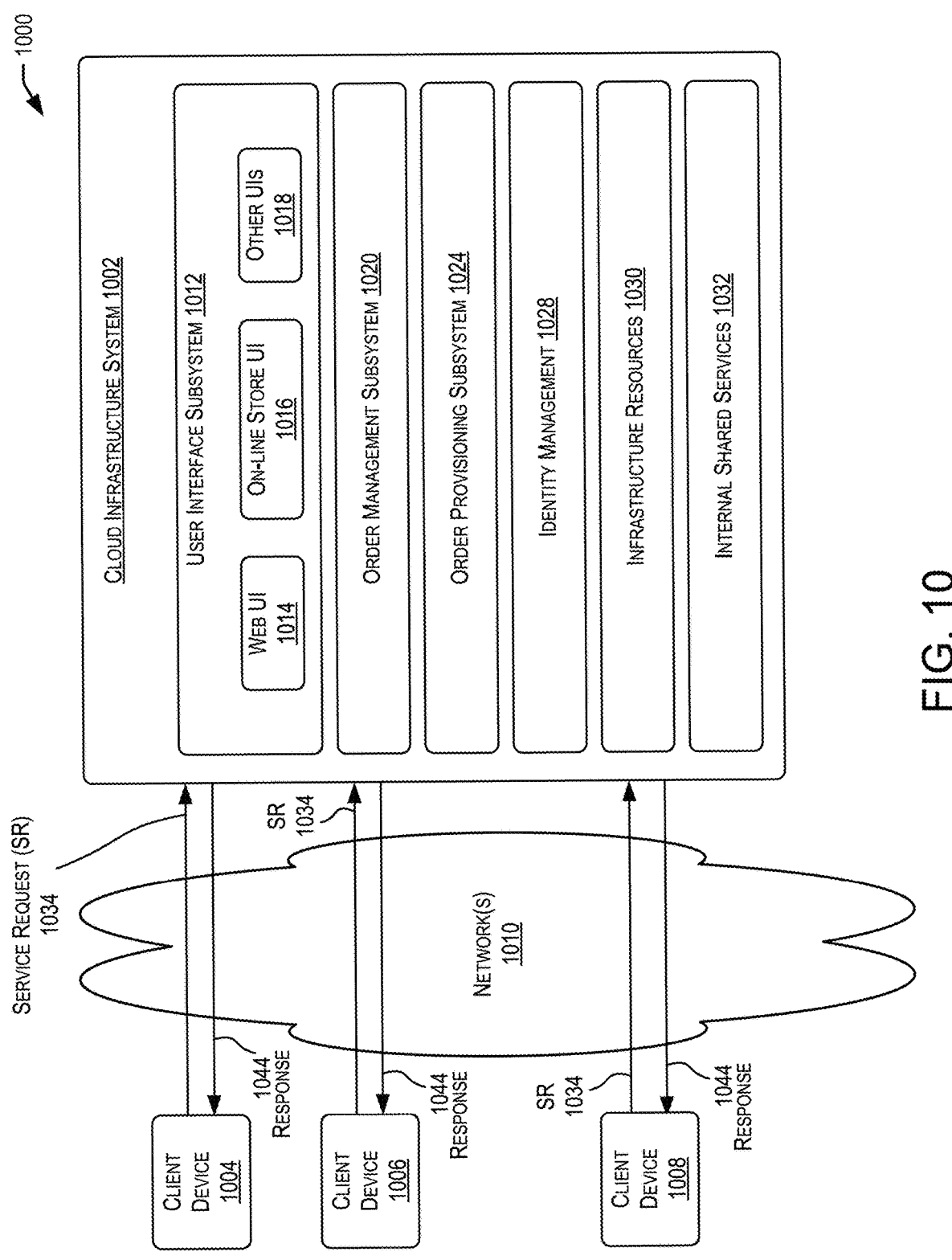
FIG. 10 is a simplified block diagram of one or more components of a system environment by which services provided by one or more components of an embodiment system may be offered as cloud services, in accordance with certain aspects.

FIG. 10 is a simplified block diagram of a cloud-based system environment in which to perform database recovery, in accordance with certain aspects. In the embodiment depicted in FIG. 10, cloud infrastructure system 1002 may provide one or more cloud services that may be requested by users using one or more client computing devices 1004, 1006, and 1008. Cloud infrastructure system 1002 may comprise one or more computers and/or servers that may include those described above for server 914. The computers in cloud infrastructure system 1002 may be organized as general purpose computers, specialized server computers, server farms, server clusters, or any other appropriate arrangement and/or combination.

Network(s) 1010 may facilitate communication and exchange of data between clients 1004, 1006, and 1008 and cloud infrastructure system 1002. Network(s) 1010 may include one or more networks. The networks may be of the same or different types. Network(s) 1010 may support one or more communication protocols, including wired and/or wireless protocols, for facilitating the communications.

The embodiment depicted in FIG. 10 is only one example of a cloud infrastructure system and is not intended to be limiting. It should be appreciated that, in some other aspects, cloud infrastructure system 1002 may have more or fewer components than those depicted in FIG. 10, may combine two or more components, or may have a different configuration or arrangement of components. For example, although FIG. 10 depicts three client computing devices, any number of client computing devices may be supported in alternative aspects.

The term cloud service is generally used to refer to a service that is made available to users on demand and via a communication network such as the Internet by systems (e.g., cloud infrastructure system 1002) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 1010 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 1002 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 1002 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 1002. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 1002. Cloud infrastructure system 1002 then performs processing to provide the services requested in the tenant's subscription order. Cloud infrastructure system 1002 may be configured to provide one or even multiple cloud services.

Cloud infrastructure system 1002 may provide the cloud services via different deployment models. In a public cloud model, cloud infrastructure system 1002 may be owned by a third party cloud services provider and the cloud services are offered to any general public tenant, where the tenant can be an individual or an enterprise. In certain other aspects, under a private cloud model, cloud infrastructure system 1002 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 1002 and the services provided may be shared by several organizations in a related community. Various other models such as hybrids of the above mentioned models may also be used.

Client computing devices 1004, 1006, and 1008 may be of different types (such as devices 902, 904, 906, and 908 depicted in FIG. 9) and may be capable of operating one or more client applications. A user may use a client device to interact with cloud infrastructure system 1002, such as to request a service provided by cloud infrastructure system 1002.

In some aspects, the processing performed by cloud infrastructure system 1002 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1002 for determining the intent of an utterance. The data used for this analysis may include structured data (e.g., data stored in a database or structured according to a structured model) and/or unstructured data (e.g., data blobs (binary large objects)).

As depicted in the embodiment in FIG. 10, cloud infrastructure system 1002 may include infrastructure resources 1030 that are utilized for facilitating the provision of various cloud services offered by cloud infrastructure system 1002. Infrastructure resources 1030 may include, for example, processing resources, storage or memory resources, networking resources, and the like.

In certain aspects, to facilitate efficient provisioning of these resources for supporting the various cloud services provided by cloud infrastructure system 1002 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1002 may itself internally use services 1032 that are shared by different components of cloud infrastructure system 1002 and which facilitate the provisioning of services by cloud infrastructure system 1002. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1002 may comprise multiple subsystems. These subsystems may be implemented in software, or hardware, or combinations thereof. As depicted in FIG. 10, the subsystems may include a user interface subsystem 1012 that enables users of cloud infrastructure system 1002 to interact with cloud infrastructure system 1002. User interface subsystem 1012 may include various different interfaces such as a web interface 1014, an online store interface 1016 where cloud services provided by cloud infrastructure system 1002 are advertised and are purchasable by a consumer, and other interfaces 1018. For example, a tenant may, using a client device, request (service request 1034) one or more services provided by cloud infrastructure system 1002 using one or more of interfaces 1014, 1016, and 1018. For example, a tenant may access the online store, browse cloud services offered by cloud infrastructure system 1002, and place a subscription order for one or more services offered by cloud infrastructure system 1002 that the tenant wishes to subscribe to. The service request may include information identifying the tenant and one or more services that the tenant desires to subscribe to. For example, a tenant may place a subscription order for a chatbot related service offered by cloud infrastructure system 1002. As part of the order, the client may provide information identifying the input (e.g. utterances).

In certain aspects, such as the embodiment depicted in FIG. 10, cloud infrastructure system 1002 may comprise an order management subsystem (OMS) 1020 that is configured to process the new order. As part of this processing, OMS 1020 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 1020 may then invoke the order provisioning subsystem (OPS) 1024 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 1024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 1002 may send a response or notification 1044 to the requesting tenant to indicate when the requested service is now ready for use. In some instances, information (e.g., a link) may be sent to the tenant that enables the tenant to start using and availing the benefits of the requested services.

Cloud infrastructure system 1002 may provide services to multiple tenants. For each tenant, cloud infrastructure system 1002 is responsible for managing information related to one or more subscription orders received from the tenant, maintaining tenant data related to the orders, and providing the requested services to the tenant or clients of the tenant. Cloud infrastructure system 1002 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 1002 may provide services to multiple tenants in parallel. Cloud infrastructure system 1002 may store information for these tenants, including possibly proprietary information. In certain aspects, cloud infrastructure system 1002 comprises an identity management subsystem (IMS) 1028 that is configured to manage tenant's information and provide the separation of the managed information such that information related to one tenant is not accessible by another tenant. IMS 1028 may be configured to provide various security-related services such as identity services, such as information access management, authentication and authorization services, services for managing tenant identities and roles and related capabilities, and the like.

Figure 11:
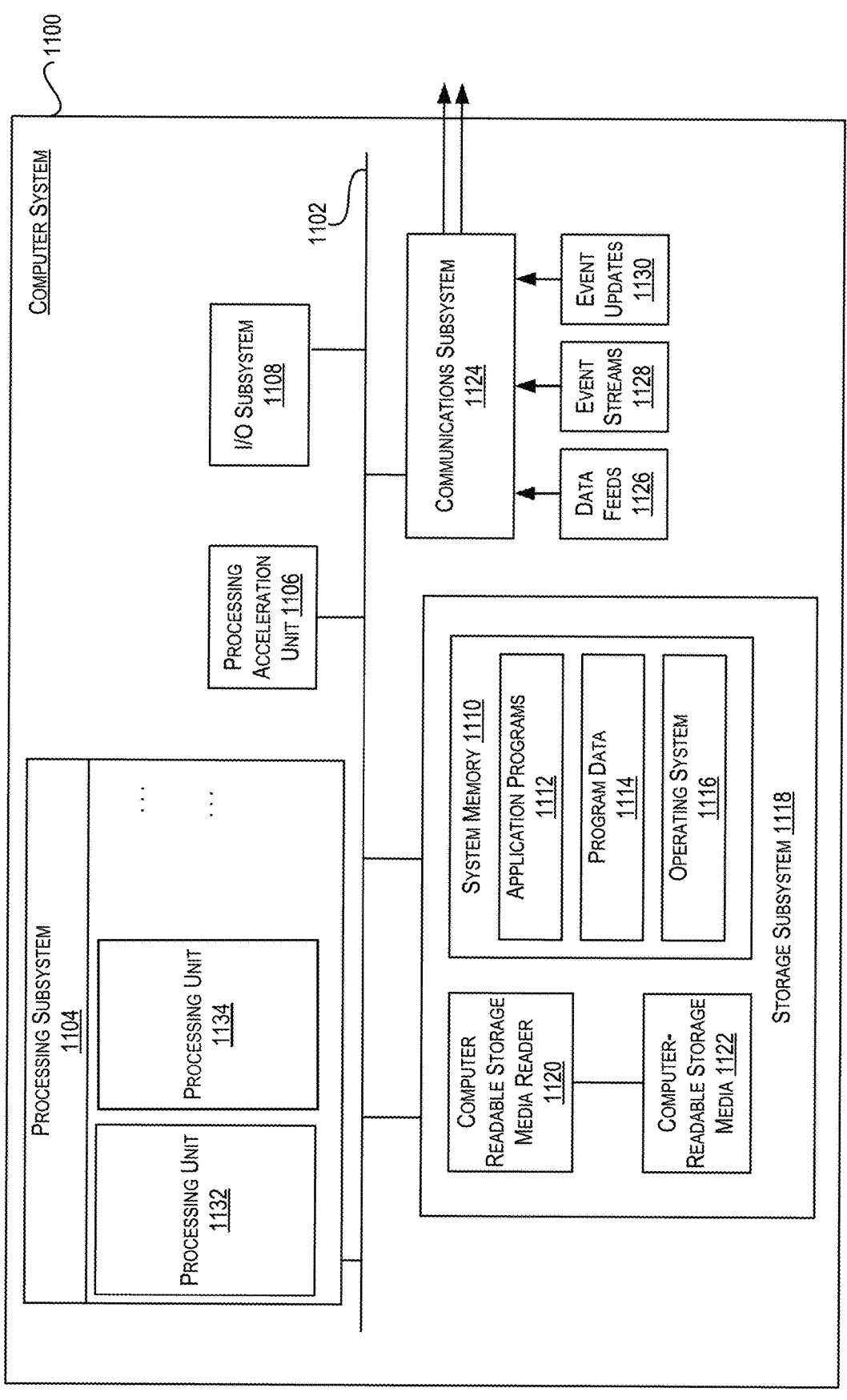
FIG. 11 illustrates an example computer system that may be used to implement certain aspects.

FIG. 11 illustrates an exemplary computer system 1100 that may be used to implement certain aspects. As shown in FIG. 11, computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118, and a communications subsystem 1124. Storage subsystem 1118 may include non-transitory computer-readable storage media including storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative aspects of the bus subsystem may utilize multiple buses. Bus subsystem 1102 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processors, application specific integrated circuits (ASICs), or field programmable gate arrays (FPGAs). The processors may be single core or multicore processors. The processing resources of computer system 1100 can be organized into one or more processing units 1132, 1134, etc. A processing unit may include one or more processors, one or more cores from the same or different processors, a combination of cores and processors, or other combinations of cores and processors. In some aspects, processing subsystem 1104 can include one or more special purpose co-processors such as graphics processors, digital signal processors (DSPs), or the like. In some aspects, some or all of the processing units of processing subsystem 1104 can be implemented using customized circuits, such as application specific integrated circuits (ASICs), or field programmable gate arrays (FPGAs).

In some aspects, the processing units in processing subsystem 1104 can execute instructions stored in system memory 1110 or on computer readable storage media 1122. In various aspects, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above. In instances where computer system 1100 is executing one or more virtual machines, one or more processing units may be allocated to each virtual machine.

In certain aspects, a processing acceleration unit 1106 may optionally be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term input device is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1100 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 1118 provides a repository or data store for storing information and data that is used by computer system 1100. Storage subsystem 1118 provides a tangible non-transitory computer-readable storage medium for storing the basic programming and data constructs that provide the functionality of some aspects. Storage subsystem 1118 may store software (e.g., programs, code modules, instructions) that when executed by processing subsystem 1104 provides the functionality described above. The software may be executed by one or more processing units of processing subsystem 1104. Storage subsystem 1118 may also provide a repository for storing data used in accordance with the teachings of this disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM), dynamic random access memory (DRAM), and the like.

By way of example, and not limitation, as depicted in FIG. 11, system memory 1110 may load application programs 1112 that are being executed, which may include various applications such as Web browsers, mid-tier applications, relational database management systems (RDBMS), etc., program data 1114, and an operating system 1116. By way of example, operating system 1116 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 1122 may store programming and data constructs that provide the functionality of some aspects. Computer-readable media 1122 may provide storage of computer-readable instructions, data structures, program modules, and other data for computer system 1100. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, digital video disc (DVD), a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1118 may also include a computer-readable storage media reader 1120 that can further be connected to computer-readable storage media 1122. Reader 1120 may receive and be configured to read data from a memory device such as a disk, a flash drive, etc.

In certain aspects, computer system 1100 may support virtualization technologies, including but not limited to virtualization of processing and memory resources. For example, computer system 1100 may provide support for executing one or more virtual machines. In certain aspects, computer system 1100 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1100. Accordingly, multiple operating systems may potentially be run concurrently by computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices. For example, the communications subsystem may be used to transmit a response to a user regarding the inquiry for a chatbot.

Communications subsystem 1124 may support both wired and/or wireless communication protocols. For example, in certain aspects, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1124 can provide wired network connectivity (e.g., Ethernet) in addition to or instead of a wireless interface.

Communications subsystem 1124 can receive and transmit data in various forms. For example, in some aspects, in addition to other forms, communications subsystem 1124 may receive input communications in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to communicate data from computer system 1100 to other computer systems or networks. The data may be communicated in various different forms such as structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

accessing a plurality of log records describing a plurality of transactions that were executed in a first occurrence over a plurality of sessions with one or more data management services that manage a set of data; wherein after the first occurrence the set of data comprises resulting values;

separating the plurality of log records into sequential segments of log records;

for a first segment of the sequential segments, generating a synchronization data structure comprising a stored indication associated with a first transaction of the first segment, wherein the stored indication is applied to constrain execution in a second occurrence of the first transaction of the first segment until after execution of at least a second transaction of the first segment; wherein the stored indication indicates a first state of a portion of the set of data that, prior to the second occurrence of the second transaction, satisfies the second transaction but not a second state that satisfies the first transaction, wherein states of portions of the set of data stored in the synchronization data structure concurrently satisfy at least two transactions even though the at least two transactions occurred, in the first occurrence, in a particular order;

executing the first transaction of the first segment in the second occurrence at least in part by accessing the synchronization data structure to constrain playback of the first transaction until after the second transaction without constraining playback between the at least two transactions;

regenerating the resulting values by executing other transactions of the sequential segments in the second occurrence, wherein at least some transactions of the other transactions are executed in a different order in the second occurrence than in the first occurrence;

storing the regenerated resulting values as a replacement set of data; and providing data management service access to the replacement set of data.

2. The computer-implemented method of claim 1, further comprising detecting a failure among the one or more data management services, wherein at least executing, regenerating, and storing are performed in response to detecting the failure.

3. The computer-implemented method of claim 1, wherein the portion of the set of data is a data block of a plurality of data blocks, wherein the first transaction and the second transaction access a same data block, and wherein the at least two transactions access different data blocks.

4. The computer-implemented method of claim 1, wherein constraining playback of the first transaction until after the second transaction comprises:

accessing the synchronization data structure by a first thread to determine that the portion of the set of data is not in the second state;

based at least in part on determining that the portion of the set of data is not in the second state, executing another transaction of a subset of transactions assigned to the first thread;

after executing the another transaction of the subset of transactions assigned to the first thread, accessing the synchronization data structure again by the first thread to determine that the portion of the set of data is in the second state; and based at least in part on determining that the portion of the set of data is in the second state, executing the first transaction.

5. The computer-implemented method of claim 1, further comprising further constraining execution of transactions in the second occurrence based at least in part on when an index was modified in the first occurrence.

6. The computer-implemented method of claim 1, further comprising:

generating one or more dictionaries of one or more compressed tables from the first occurrence; and using the one or more dictionaries in the second occurrence to validate a log record of the first transaction.

7. The computer-implemented method of claim 1, further comprising:

capturing a checkpoint of the set of data; and starting the regenerating of the resulting values from the checkpoint.

8. The computer-implemented method of claim 1, wherein separating the plurality of log records into the sequential segments of log records uses delimiters to separate log records based on space consumed by the log records.

9. The computer-implemented method of claim 8, wherein log records of a first segment are designated to be of the first segment by recording of a first log record delimiter for the first segment, and log records of a second segment are designated to be of the first segment by the recording of a second log record delimiter for the second segment.

10. The computer-implemented method of claim 1, wherein log records of a single database session are spread over a plurality of segments.

11. A computer-program product comprising one or more non-transitory machine-readable storage media, including stored instructions configured to cause a computing system to perform a set of actions including:

accessing a plurality of log records describing a plurality of transactions that were executed in a first occurrence over a plurality of sessions with one or more data management services that manage a set of data; wherein after the first occurrence the set of data comprises resulting values;

separating the plurality of log records into sequential segments of log records;

for a first segment of the sequential segments, generating a synchronization data structure comprising a stored indication associated with a first transaction of the first segment, wherein the stored indication is applied to constrain execution in a second occurrence of the first transaction of the first segment until after execution of at least a second transaction of the first segment, wherein the stored indication indicates a first state of a portion of the set of data that, prior to the second occurrence of the second transaction, satisfies the second transaction but not a second state that satisfies the first transaction, wherein states of portions of the set of data stored in the synchronization data structure concurrently satisfy at least two transactions even though the at least two transactions occurred, in the first occurrence, in a particular order;

executing the first transaction of the first segment in the second occurrence at least in part by accessing the synchronization data structure to constrain playback of the first transaction until after the second transaction without constraining playback between the at least two transactions;

regenerating the resulting values by executing other transactions of the sequential segments in the second occurrence, wherein at least some transactions of the other transactions are executed in a different order in the second occurrence than in the first occurrence;

storing the regenerated resulting values as a replacement set of data; and providing data management service access to the replacement set of data.

12. The computer-program product of claim 11, wherein the portion of the set of data is a data block of a plurality of data blocks, wherein the first transaction and the second transaction access a same data block, and wherein the at least two transactions access different data blocks.

13. The computer-program product of claim 11, wherein constraining playback of the first transaction until after the second transaction comprises:

accessing the synchronization data structure by a first thread to determine that the portion of the set of data is not in the second state;

based at least in part on determining that the portion of the set of data is not in the second state, executing another transaction of a subset of transactions assigned to the first thread;

after executing the another transaction of the subset of transactions assigned to the first thread, accessing the synchronization data structure again by the first thread to determine that the portion of the set of data is in the second state; and based at least in part on determining that the portion of the set of data is in the second state, executing the first transaction.

14. The computer-program product of claim 11, wherein the set of actions further includes:

further constraining execution of transactions in the second occurrence based at least in part on when an index was modified in the first occurrence.

15. The computer-program product of claim 11, wherein the set of actions further includes:

capturing a checkpoint of the set of data; and starting the regenerating of the resulting values from the checkpoint.

16. The computer-program product of claim 11, wherein separating the plurality of log records into the sequential segments of log records uses delimiters to separate log records based on space consumed by the log records.

17. A system comprising:

one or more processors;

one or more non-transitory computer-readable media storing instructions, which, when executed by the system, cause the system to perform a set of actions including:

accessing a plurality of log records describing a plurality of transactions that were executed in a first occurrence over a plurality of sessions with one or more data management services that manage a set of data; wherein after the first occurrence the set of data comprises resulting values;

separating the plurality of log records into sequential segments of log records;

for a first segment of the sequential segments, generating a synchronization data structure comprising a stored indication associated with a first transaction of the first segment, wherein the stored indication is applied to constrain execution in a second occurrence of the first transaction of the first segment until after execution of at least a second transaction of the first segment, wherein the stored indication indicates a first state of a portion of the set of data that, prior to the second occurrence of the second transaction, satisfies the second transaction but not a second state that satisfies the first transaction, wherein states of portions of the set of data stored in the synchronization data structure concurrently satisfy at least two transactions even though the at least two transactions occurred, in the first occurrence, in a particular order;

executing the first transaction of the first segment in the second occurrence at least in part by accessing the synchronization data structure to constrain playback of the first transaction until after the second transaction without constraining playback between the at least two transactions;

regenerating the resulting values by executing other transactions of the sequential segments in the second occurrence, wherein at least some transactions of the other transactions are executed in a different order in the second occurrence than in the first occurrence;

storing the regenerated resulting values as a replacement set of data; and providing data management service access to the replacement set of data.

18. The system of claim 17, wherein the portion of the set of data is a data block of a plurality of data blocks, wherein the first transaction and the second transaction access a same data block, and wherein the at least two transactions access different data blocks.

19. The system of claim 17, wherein constraining playback of the first transaction until after the second transaction comprises:

accessing the synchronization data structure by a first thread to determine that the portion of the set of data is not in the second state;

based at least in part on determining that the portion of the set of data is not in the second state, executing another transaction of a subset of transactions assigned to the first thread;

after executing the another transaction of the subset of transactions assigned to the first thread, accessing the synchronization data structure again by the first thread to determine that the portion of the set of data is in the second state; and based at least in part on determining that the portion of the set of data is in the second state, executing the first transaction.

20. The system of claim 17, wherein the set of actions further includes:

further constraining execution of transactions in the second occurrence based at least in part on when an index was modified in the first occurrence.

21. The system of claim 17, wherein separating the plurality of log records into the sequential segments of log records uses delimiters to separate log records based on space consumed by the log records.

* * * * *